United States Patent [19]
Clark

[11] 3,869,559
[45] Mar. 4, 1975

[54] PROCESS FOR SEPARATION AND CLEANING OF EDIBLE VEGETABLE PRODUCTS

[76] Inventor: Thomas P. Clark, 6127 Flower St., Arvada, Colo. 80002

[22] Filed: Apr. 13, 1970

[21] Appl. No.: 27,907

[52] U.S. Cl................. 426/481, 426/506, 426/507, 209/18, 209/173, 209/211, 134/26, 34/34
[51] Int. Cl................................................ A23l 1/00
[58] Field of Search ............ 99/100, 103, 239, 240; 209;18;172;211/; 134/26, 34; 426/481, 506, 507

[56] References Cited
UNITED STATES PATENTS

| | | | |
|---|---|---|---|
| 1,822,276 | 9/1931 | Dunkley | 209/211 |
| 1,887,239 | 11/1932 | Hamon | 209/173 |
| 1,996,022 | 3/1935 | Lewis | 209/173 |
| 2,109,121 | 2/1938 | Thorold | 209/173 |
| 2,320,335 | 6/1943 | Bauer | 209/173 |
| 2,422,657 | 6/1947 | Cleveland | 209/173 |
| 2,554,495 | 5/1951 | key | 209/173 |
| 3,486,619 | 12/1969 | Grundelius | 209/211 |
| 3,503,503 | 3/1970 | Ramond | 209/211 |

Primary Examiner—Wilbur L. Bascomb, Jr.
Assistant Examiner—Martin G. Mullen
Attorney, Agent, or Firm—Burton, Crandell & Polumbus

[57] ABSTRACT

A process for the separation of beans and like edible food products from foreign vegetable and non-vegetable substances in which the food products and foreign substances are mixed with separation solutions of a predetermined specific gravity, the food product is separated from the foreign substances in hydrocyclone separators, and the separation solutions are recovered and recycled.

4 Claims, 1 Drawing Figure

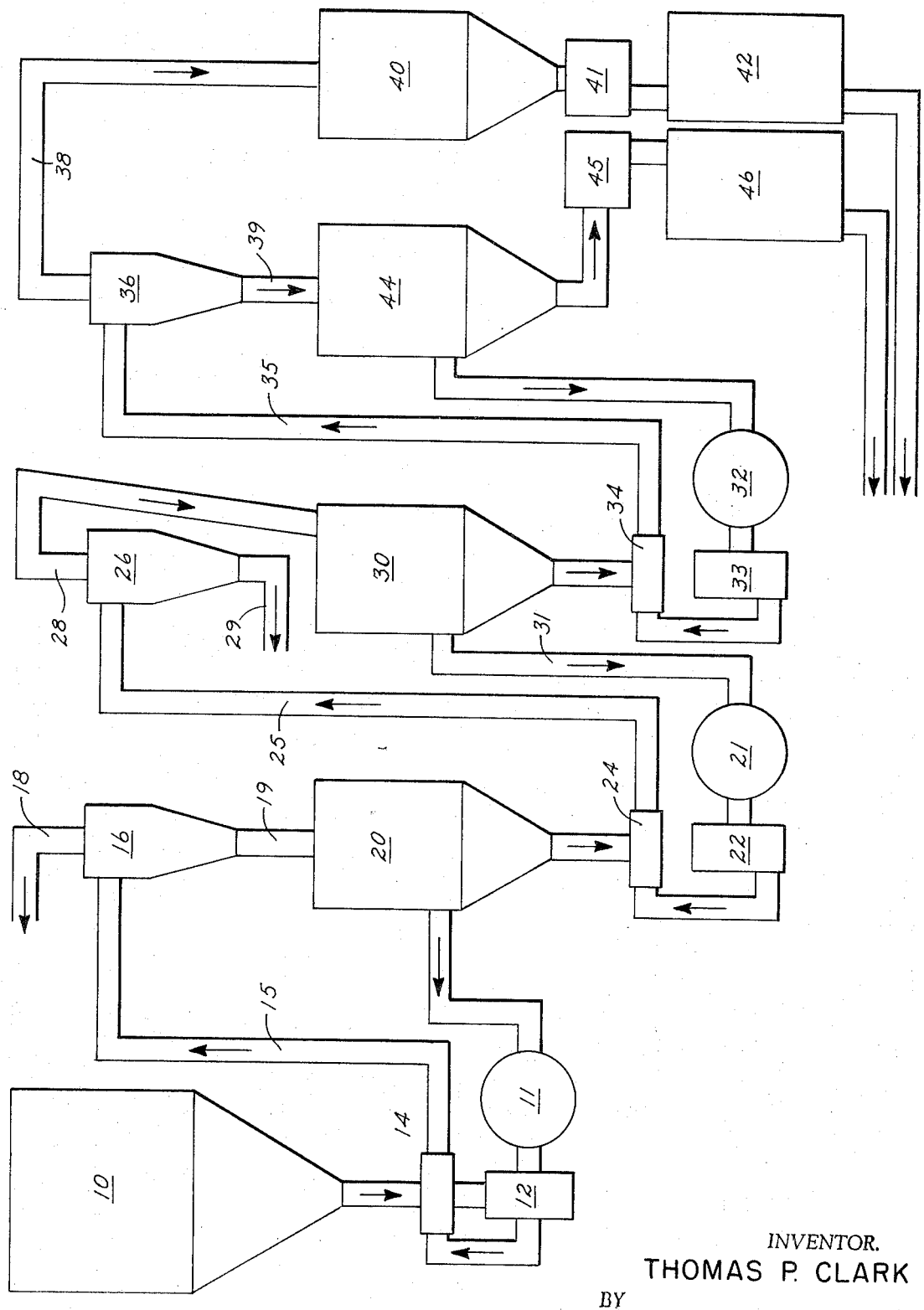

PROCESS FOR SEPARATION AND CLEANING OF EDIBLE VEGETABLE PRODUCTS

FIELD OF THE INVENTION

The present invention relates to a continuous, wet, dynamic process for separating beans and like vegetable products from foreign vegetable and non-vegetable substances and also for classifying said vegetable products into splits, wholes or sizes.

BACKGROUND OF THE INVENTION

Various methods and processes have been proposed for the separation and cleaning of edible vegetable and fruit products. See for example: U.S. Pat. No. 1,822,276 to Dunkley, for Fruit Treatment Machine and Method; U.S. Pat. No. 2,320,335 to Bauer, for Quality Grader; U.S. Pat. No. 2,422,657 to Cleveland, for Hydraulic Separation of Stones from Peas; and U.S. Pat. No. 2,554,495 to Key, for Apparatus for Separating Solids According to Their Specific Gravities.

OBJECTS OF THE INVENTION

It is the object of the present invention to provide an improved continuous, dynamic, wet, gravity process for cleaning and separating edible vegetable products from non-edible or undesired foreign substances.

Another object of the present invention is to provide an improved process for separating both foreign substances from edible vegetable products such as beans and for classifying the beans or other food products during the cleaning and separation operations.

Another object of the present invention is to provide a process of the foregoing character which is continuous, dynamic, highly efficient, does not damage or contaminate the edible food products and is capable of being carried out efficiently and economically on a large scale.

A further object of the present invention is to provide a continuous wet gravity process for the separation and cleaning of edible food products in which process the food products are cleaned and separated rapidly and under conditions such as to prevent the products from becoming water soaked or otherwise damaged.

SUMMARY

The foregoing objects are accomplished by the process of the present invention wherein vegetable food products, such as beans are cleaned, separated and classified by the use of injection mixing with separation solutions followed by separation in a hydrocyclone separator. In the illustrative process disclosed, in which beans are the edible food product being cleaned and separated, the beans, in both splits and wholes, and mixed with foreign substances such as rocks, dirt, stems, leaves and other foreign vegetable and nonvegetable matter, are placed in a feed storage bin. The food product and other substances are then fed from this bin to a venturi mixer in which the solids are mixed with a saline solution having a specific gravity such that lighter than bean substances will float and the bean products and heavier substances will sink. The suspension of bean products and other substances in the separation solution is pumped to a first hydrocyclone separator where the lighter than bean materials are separated in the overflow and the heavier than bean materials and bean products themselves pass out in the underflow. Each of these separation streams are passed through dewatering devices which separates the separation solution from the solid materials. Essentially, the dewatering devices utilized are gravity flow wedge wire sieves. The recovered separation solution is directed back to a storage tank from which it is again pumped through the venturi and recycled. The lighter than bean material is feed to a storage area for later processing.

The remaining feed is introduced into a second saline separation solution having a specific gravity such that the bean food products will float and the heavier than bean products will sink. The mixed solids and separation solution is pumped to a second hydrocyclone separator where the bean products are separated in the overflow and the heavier than bean materials separate with the underflow. Again the streams are dewatered and the separation solution recycled. The heavier than bean material is discarded or stored for further processing.

The beans themselves may then be feed to a third venturi in which they are mixed with a third saline separation solution having a specific gravity such that split and imperfect beans sink and are taken off with the underflow, while whole beans float and are removed with the overflow. As in the previous cycles, the solid materials are separated from the separation solution by dewatering devices and the separation solution is feed to a storage tank for recycling. The separated split and whole beans are washed, dewatered and dried for packaging or further processing.

DESCRIPTION OF THE DRAWING

The single FIGURE of the drawing is a schematic flow diagram illustrating the process embodying the present invention.

DESCRIPTION OF THE PREFERRED EMBODIMENT

The illustrative process embodying the present invention a schematic diagram of which is shown in the drawing, serves to separate beans, or other edible food products, from foreign substances including both heavier than bean materials and lighter than bean materials. Such foreign substances are accumulated during the harvesting of the beans or other products and include rocks, dirt, weed materials, stems, leaves and other undesirable substances. It is necessary, of course, to process the beans or other products in such a manner that the actual edible food product is not damaged or water soaked. While the process is described in conjunction with the cleaning and separation of beans, it will be appreciated that a wide variety of food products other than beans may be cleaned and separated in accordance with the herein described process.

In the illustrative process, saline separation solutions having measured specific gravities are utilized. Basically, the solutions are aqueous calcium chloride solutions, having a specific gravity adjusted to the desired level, and with added wetting or surface active agents. When bean products such as pinto beans are to be cleaned and separated, it has been found that the edible bean product will sink in solution having a specific gravity equal to or less than 1.15, and will float in a separation solution having a specific gravity equal to or greater than 1.34. The edible food product may be classified further by utilizing a solution having a specific gravity of about 1.26, in which whole beans will float but split beans will sink.

In the process shown in the drawing, edible bean products mixed with undesired foreign substances are placed in a storage bin 10. A separation solution having a specific gravity equal to or less than 1.15 is contained in a solution tank 11. Separation solution is pumped from tank 11 by a pump 12 through a venturi mixer 14 in which the solid bean products and foreign materials from the bin 10 are dynamically mixed with the separation solution to form a suspension of solids in the liquid solution. The suspension of solid materials in the separation solution is rapidly fed through a conduit 15 into a hydrocyclone separator 16. The lighter than bean foreign materials are removed from the hydrocyclone separator as overflow through an overflow conduit 18, while the bean products and heavier than bean products are removed from the hydrocyclone separator 16 as underflow through an underflow conduit 19 and are directed to a dewatering apparatus 20 such as a gravity flow wedge wire sieve apparatus. The overflow from the conduit 18 is also dewatered and the lighter than bean materials are passed to waste or storage for further processing. Recovered separation solution is recycled into solution tank 11 for further use. If additional wash water is added in the dewatering apparatus 20, the specific gravity of the solution may be adjusted in tank 11.

Solid materials including edible bean products and heavier than bean products are processed further from the dewatering unit 20. A separation solution having a specific gravity of equal to or greater than about 1.34 is contained in a storage solution tank 21. This relatively heavy specific gravity solution is pumped by a pump 22 to a venturi mixer 24 where solid materials from the dewatering tank 20 are dynamically mixed with the separation solution from tank 21 to form a suspension. The suspension of solid materials in the separation solution is conducted through conduit 25 to a second hydrocyclone separator 26. In this hydrocyclone separator, the edible bean products pass out as the overflow through conduit 28 while the heavier than bean materials pass out as the underflow from the hydrocyclone separator 26 through conduit 29. The heavier than bean materials are separated from the separation solution and are passed to waste or storage. The overflow containing the edible bean product is directed through conduit 28 to a dewatering unit 30 from which the separation solution is removed and is conducted through conduit 31 back into the solution tank 21. Also, separation solution removed with the waste materials is recycled to solution tank 21. Again, the specific gravity of the separation solution in tank 21 may be continuously adjusted to maintain it at the proper level.

If it is desired to further classify the edible bean products as to size, splits or wholes, a third separation stage may be utilzed. In this stage, a separation solution having a specific gravity of between 1.15 and 1.34, and preferably about 1.26 is contained in a solution tank 32. This solution is pumped by pump 33 to a venturi mixer 34 where it mixes with the bean products from the dewatering apparatus 30. The suspension of solid bean materials in the separation solution flows through conduit 35 into a third hydrocyclone separator 36. In this hydrocyclone separator whole bean products pass out as the overflow through a conduit 38 while splits and fractional bean materials pass out as the underflow through conduit 39.

Both bean product fractions are dewatered by an appropriate dewatering device such as gravity flow wedge wire sieves. The whole bean products are dewatered by dewatering device 40 and then are washed in a suitable washer 41 and passed to a dryer 42 from which they are passed to storage. Similarly, splits are dewatered in a dewatering apparatus 44, are washed by a washer 45 and passed to a dryer 46 from which they are sent to storage. In both instances, the bean products may be further processed and packaged in the usual manner.

It will be appreciated by those skilled in the art that other edible food products may be processed in a similar manner, by making appropriate adjustments to the specific gravity of the various separation solutions. The process as described is a continuous process, beans or like food products and other foreign substances being continuously supplied to the initial storage bin 10 and cleaned, dried and classified edible food products being continuously withdrawn to storage from the final classification steps and dryers. The various separation solutions are continuously recycled, additional reagents being added to maintain the desired concentrations. The separated foreign materials may be further processed where desired or may be discarded as waste.

While a certain illustrative embodiment of the present invention has been shown in the drawing and described above in considerable detail, it should be understood that there is no intention to limit the invention to the specific form disclosed. On the contrary, the intention is to cover all modifications, alternative constructions, equivalents and uses falling within the spirit and scope of the invention as expressed in the appended claims.

I claim as my invention:

1. A process for the continuous separation of edible vegetable products from both heavier and lighter foreign substances, comprising the steps of continuously dynamically mixing and suspending vegetable products to be cleaned and separated with a first separation solution having a specific gravity such that the vegetable product and heavier substances tend to sink and lighter substances tend to float in said solution, separating said suspended vegetable product and heavier substances from said lighter substances in a hydrocyclone separator, separating said vegetable product and heavier substance from said separation solution, dynamically mixing and suspending said vegetable product and heavier substances with a second separation solution having a specific gravity such that the vegetable product tends to float and the heavier than vegetable product substances tend to sink, separating said suspended vegetable product from said heavier substances in a hydrocyclone separator, and separating said vegetable product from said second separation solution.

2. The continuous process of separating edible vegetable products from foreign substances which are both lighter and heavier than said edible vegetable product, comprising the steps of dynamically mixing and suspending the vegetable product, heavier and lighter substances with a first separation solution having a specific gravity such that the vegetable product and heavier substances tend to sink and the lighter substances tend to float, separating said suspended vegetable product and heavier substances from the lighter substances in a hydrocyclone separator, removing said first separation solution from said vegetable product and substances and recycling said solution, dynamically mixing and suspending said vegetable product and heavier substances with a second separation solution having a specific gravity such that the vegetable product tends to float and the heavier substances tend to sink, separating said suspended vegetable product from said heavier substances in a hydrocyclone separator, and removing said second separation solution from said second vegetable product and said heavier substances and recycling said solution.

3. The process defined in claim 2 including the steps of dynamically mixing and suspending the separated edible vegetable product with a third separation solution having a specific gravity such that split and undersized portions of said vegetable product tend to sink and the whole portions of said vegetable product tend to float, separating said suspended whole portions from said suspended split portions in a hydrocyclone separator, separating said whole and split portions from said third separation solution, and recycling said separation solution.

4. The process as defined in claim 3 wherein the solid vegetable product and heavier and lighter substances are mixed with said separation solutions in venturi mixers.

* * * * *